United States Patent [19]

Boutwell

[11] Patent Number: 4,507,954

[45] Date of Patent: Apr. 2, 1985

[54] WRAPAROUND USED FOR TESTING TUBING WITH PREMIXED GASES

[75] Inventor: Johnie R. Boutwell, Houma, La.

[73] Assignee: Tubing Testors, Inc., Houma, La.

[21] Appl. No.: 507,688

[22] Filed: Jun. 27, 1983

[51] Int. Cl.³ .............................................. G01M 3/22
[52] U.S. Cl. .......................................... 73/40.7; 73/46
[58] Field of Search .................. 73/40.7, 46, 40, 49.1, 73/49.5, 49.2, 49.3

[56] References Cited

U.S. PATENT DOCUMENTS

| | | |
|---|---|---|
| 1,997,987 | 4/1935 | Victor, Jr. . |
| 2,062,435 | 12/1936 | Weiland . |
| 2,567,926 | 9/1951 | Dunkelberger . |
| 2,706,398 | 4/1955 | Davidson .............................. 73/40 |
| 2,766,614 | 10/1956 | Cook ..................................... 73/46 |
| 2,996,661 | 8/1961 | Roberts . |
| 3,280,619 | 10/1966 | Spies ................................... 73/40.7 |
| 3,585,845 | 6/1971 | Cornell et al. ...................... 73/40.7 |
| 3,592,048 | 7/1971 | Maurice et al. ..................... 73/40.7 |
| 3,690,151 | 9/1972 | Briggs ................................. 73/40.7 |
| 3,712,115 | 1/1973 | Miller .................................. 73/49.1 |
| 3,762,212 | 10/1973 | Morley et al. ....................... 73/40.7 |
| 3,837,228 | 9/1974 | Nemeth et al. ...................... 73/40.7 |
| 3,949,596 | 4/1976 | Hawk ................................... 73/40.7 |
| 4,282,743 | 8/1981 | Pickett ................................. 73/46 |

FOREIGN PATENT DOCUMENTS 2329525 1/1975 Fed. Rep. of Germany ....... 73/49.3

OTHER PUBLICATIONS

*Special Halogen Leak Test Head*, in Research Disclosure, published by Indus. Opport. Ltd., No. 147, p. 35, Jul. 1976.

Primary Examiner—Gerald Goldberg
Assistant Examiner—Joseph W. Roskos
Attorney, Agent, or Firm—Charles C. Garvey, Jr.

[57] ABSTRACT

A pipe joint testing device for testing the joint integrity of two connected pipe sections, each having a bore and pressurized with gas at the joint area during testing uses an annular envelope which can be affixed about the annular external joint of two pipe sections being tested. An inner annular header having a gas inlet with openings which communicate circumferentially with the envelope is provided internally of the envelope. A suction line is connected to the header at a tee connection, for example, for drawing gas from the envelope through the openings. In this manner, any gas leaking from the joint at any radial position along the joint will be detected because it will enter through one of the openings in the header.

6 Claims, 3 Drawing Figures

WRAPAROUND USED FOR TESTING TUBING WITH PREMIXED GASES

BACKGROUND OF THE INVENTION

1. Technical Field

The present invention relates generally to leak detection and more specifically relates to a pipe joint leak detection apparatus which is used when a "test" or "tracer" gas pressurizes the pipe section adjacent the joint and leaks are tested by a detector sensing the presence of the test gas externally of the joint being tested in the event of a leak.

2. General Background

In the testing of oilfield drill pipe and the like, the joint between two adjacent sections of pipe must be tested before the pipe is put inot service. The integrity of the joint once it is assembled is tested by pressurizing the pipe bore adjacent the joint. The pipe bore can be "packed off" or sealed above and below the joint and the area between the seals then pressurized with a test fluid. One type of test involves the use of "helium" as a test or tracer gas. A "helium" test involves pressurizing the area around the joint and inside the pipe bore. A helium detector or "sniffer" then checks the area at the joint externally of the pressurized bore. The presence of helium as detected by the leak detector (a conventional, commercially available item) indicates a leak from the pipe bore through the threaded joint and into the atmosphere externally of the pipe bore. Helium is often used as a test or tracer gas because the helium molecule is very small and thus will pass through even the smallest unsealed area between the two threaded pipe sections, if in fact they are not assembled fully or properly.

U.S. Pat. No. 3,949,596 issued to Lawrence S. Hawk and entititled "Leak Test Fixture and Method for Using Same" discusses as background information, the conventional prior art "helium leak test" and its use in the testing of pipe joints.

Other patents show various methods for testing leakage using helium.

U.S. Pat. No. 2,062,435 entitled "Method and Means of Detecting Refrigerant Leaks" provides a system which uses a member filled with a gas and rubber composition permanently spread or coated over the surface of the area to be tested and allowed to become set so that in the event of a leak of gas through the member the rubber will give a visible indication of the leak.

"Leak Detection" is the subject of U.S. Pat. No. 2,706,398 issued Apr. 19, 1955. That patent discusses a sampling probe having a body, an elongated tube affixed to and projecting from the body and having an orifice at one end remote from the body, a needle mounted in the body which extends through the tube and into the orifice, the body having a passageway connected between the tube and the exterior of the body, and conduit connecting the passageway with an analytical device.

A "Method and Apparatus for Testing and Protecting Gas Main Joints" is the subject of U.S. Pat. No. 2,766,614. The method uses a blanket which is wrapped around a joint adjacent the end portions of a gas main with the side edges of the blanket being drawn into tight sealing engagement with the gas main on each side of the joint. The tightened blanket remains on the joint a sufficient time for leaking gas to accumulate under the blanket and a hollow needle is connected to the blanket and to a gas indicating instrument through a self-closing hole in the blanket so as to sample the atmosphere within the blanket. Sampling this atmosphere determines whether or not gas is present in the atmosphere under the blanket and externally of the pipe joint.

U.S. Pat. No. 2,996,661 entitled "Leak Detector Proportioning Probe" shows a "Sniffing" probe for use in leak detection of vessels, pipes, and other closed systems.

A Method and Apparatus for the Detection of Leaking Gas is described in U.S. Pat. No. 2,550,498 issued to Chester Rice. Tracer gas is introduced into a closed system and its presence outside is detected as an indication of a leak by direct probing of the joints or fittings around the area suspect of leakage with an intake probe connected through the discharge device to a vacuum pump. The presence of a leak produces an increased amount of tracer gas in the region of the leak area which in turn produces a corresponding variation in current in the electrical discharge device circuit. Such variations may be indicated either through an instrument in circuit with the current or by a signaling device acutated at some preset amount of current.

U.S. Pat. No. 3,585,845 shows a "Gas Leak Detector" which uses a halogen-containing tracer gas which is introduced into a vessel to be tested for a leak. A probe is used through which air in the vicinity of a suspected leak may be drawn and diluted with an inert gas before being passed through an electron capture detector cell, the electric current through the cell serving to detect the presence of the tracer gas.

U.S. Pat. No. 3,592,048 issued to Louis P. Maurice et al. shows a "Portable Helium Leak Detector" wherein a first housing has an analyzer cell, the vacuum producing units and a vacuum connection arrangement to feed gas from the apparatus or arrangement that is being tested for leaks. If the helium gas to the unit being tested leaks and is fed to the analyzer cell, it will determine such to provide a signal. The second housing has the electronic portions, the indicating means and the control switches, such being connected to the first housing by an electrical cable connection. The second housing is separate from the first housing and is adapted to be placed close to the operators and remote from the first housing so as to be accessible to the operators so that they can read the indicators and can operate the control switches.

U.S. Pat. No. 3,690,151 relates to mass spectrometer leak detectors.

U.S. Pat. No. 3,762,212 provides a leak testing device forming a chamber wherein the device is placed in a test chamber following which a differential pressure is established between the chamber of the device and the test chamber. A tracer gas is introduced to the higher pressure chamber and communication is established between the lower pressure chamber and detecting apparatus such as a mass spectrometer which is sensitive to the tracer medium so as to detect any leakage of the tracer medium from the higher pressure chamber to the lower pressure chamber. At the inlet to the detecting apparatus is established a pressure chamber as to provide laminar flow from the lower pressure chamber to the inlet to the detecting apparatus.

U.S. Pat. No. 3,837,228 entitled "Tracer Gas-Permeable Probe for Leak Detectors" shows a leak detector system which employs a predetermined tracer gas, such as helium, the detector probe being provided with a plastic film which is selectively permeable to the tracer gas in preference to all other atmospheric gases.

GENERAL DISCUSSION OF THE PRESENT INVENTION

While the testing of leakage using helium as a tracer gas per se is known in the art, the present apparatus provides an improved pipe joint testing device which is used in the testing of two connected pipe joint sections, each having a bore which is pressurized with gas at the joint during testing. The present invention thus provides an annular envelope having means for affixing the envelope to the annular external joint of two pipe sections being tested. Disposed internally of the envelope is an annular header having a plurality of gas inlet openings which communicate circumferentially with the envelope interior. A connection is provided for attaching a suction to the annular header for drawing gas from the envelope through the openings and into the header so that gas leaking from any radial position of the pipe joint will quickly enter the header and thus quickly be sensed by a probe which is in the vacuum line connected to the suction connection.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
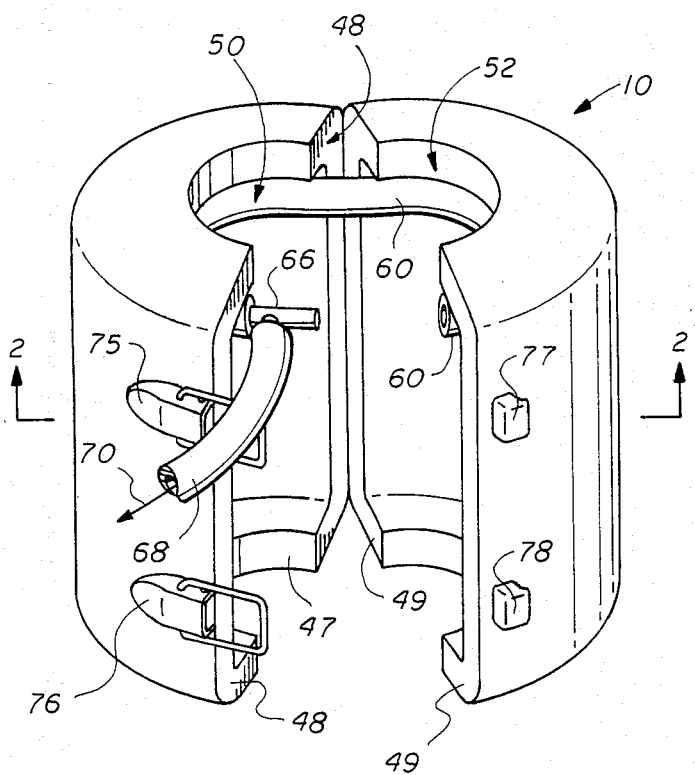
FIG. 1 is a perspective view of the preferred embodiment of the apparatus of the present invention shown disassembled and removed from a pipe joint being tested.
Figure 2:
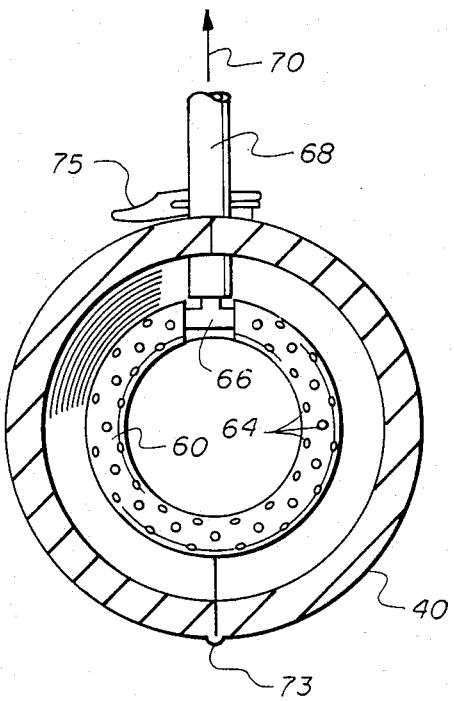
FIG. 2 is a sectional view of the preferred embodiment of the apparatus of the present invention taken along lines 2—2 of FIG. 1 but showing the envelope in the closed operative positions.
Figure 3:
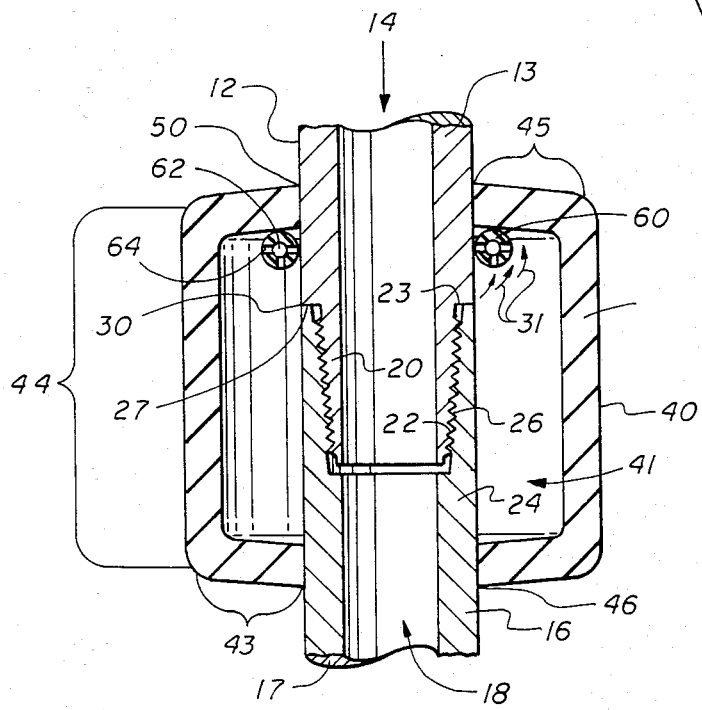
FIG. 3 is a sectional, elevational view of the preferred embodiment of the apparatus of the present invention shown in use during the testing of a pipe joint assembly.

FIGS. 1-3 show the preferred embodiment of the apparatus of the present invention designated generally by the numeral 10. A pair of pipe joints 12, 16 (such as conventional oil well drill pipe), each having threaded portions which are connectable together to form an assembly can be seen best in FIG. 2. Pipe joint 12 provides an annular wall 13 which is curved to define therewithin an inner bore 14. Joint 16 similarly provides wall 17 and bore 18. A pin end portion of joint 12 provides threads 22 and a shoulder 23. Joint 16 provides box end 24 and associated threads 26 as well as shoulder 27. Upon assembly, threads 22 and 26 engage as shown in FIG. 3 and upon complete assembly shoulder 27 and shoulder 23 abut. This pin and box joint is conventional and known in the drill pipe art.

The assembly of joints 12, 16 provides an interface 30 which appears as a circumferential line upon assembly of the two sections 12, 14. It is through this interface 30 that leaks will escape if in fact the two pipe joint sections 12, 16 are not properly assembled or if some defect is present in either of the pipe joints 12, 16 or in their associated threads 22, 26. Arrows 31 schematically illustrate the presence of a leak which has caused the test gas (also known as "tracer" gas) to move from either bore 14 or bore 18 through the connection of threads 22, 26 and discharging throug interface 30.

FIG. 1-3 show an annular envelope 40 as defined by an integral annular wall 42 of, for example, a plastic or rubber material or the like. Neoprene or polyurethane, for example, would be exemplary materials for annular wall 42. Wall 42 comprises generally a lower generally horizontal portion 43, a central generally vertical portion 44, and an upper generally horizontal section 45. As can be seen from an inspection of FIG. 3, these three sections 43-45 are integrally connected to form one continuous annular wall 42.

Envelope 40 provides a lowermost opening 46 and an uppermost opening 50. Opening 46 defines an annular surface 47 which normally seals against pipe joint 16. Openings 46, 50 have an internal diameter (I.D.) substantially equal to the respective pipe joint 12, 16 outer diameters (O.D.). Opening 50 provides an annular surface 52 which normally seals against joint 12. Note that these sealing surfaces 47, 52 seal respectively against the pipe joints on opposite sides of interface 30 so as to isolate interface 30 by means of an inner space 41 of envelope 40. Disposed within interior space 41 and within the confines of annular wall 42 is header 60. FIG. 2 best shows header 60 as being a circumferential or annular header which completely surrounds joint 12 externally of wall 13 and preferably above interface 30 between joint 12 and join 16. Annular header 60 is perforated with a plurality of openings 64 which communicate with an interior bore 62 (see FIG. 3). By providing a plurality of perforations 64 which communicate with bore 62 circumferentially about pipe joints 12, 14, a leak in any radial position of interface 30 will immediately enter header 60 through one of the perforations 64 if a vacuum or suction is applied, continuously drawing air through all openings 64 and into bore 62. This is achieved by placing Tee section 66 as part of header 60 with suction line 68 protruding through annular wall 42 and exteriorly thereof. A rounded cut or opening (not shown) could be formed in evelope 40 so that line 68 could pass therethrough. Arrow 70 in FIGS. 1 and 2 schematially illustrate the drawing of a suction through lines 68 so as to continuously draw any leaking fluid from inner space 41 into ehader bore 62 through openings 64. It should be understood that vacuum applied as indicated schematically by arrow 70 would not be of such a value as to cause a collapse of wall 42 but would be of sufficient vacuum to remove any leaking gas as is schematically illustrated by arrows 31 in FIG. 3. Thus, a tracer gas such as helium which would pressurize bores 14, 16 could be quickly detected, for example, by placing a helium detector in line 68 while vacuum 70 was applied. Indeed, some conventional helium leak detecting devices (or "sniffers" as they are known in the art) apply a slight vacuum at their probe so as to continuously draw air being tested into the sniffer. Such a "sniffer" would be hooked to line 68. Such a sniffer is schematically illustrated by the arrow 70 in FIG. 2. A sniffer is not shown in the drawings other than in this schematic fashion because such an item is a commercially available item and a man skilled in the art would know how to attach such a device to line 68.

A pair of vertical cuts can be seen in FIG. 1 as forming a portion of envelope 40. These cuts define a pair of vertical faces which mate together to form a seal upon placement of envelope 40 about pipe sections 12, 16. Note, for example, in FIG. 1 mating faces 48 and 49 which abut as shown in FIG. 2 upon assembly.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

What is claimed as invention is:

1. A pipe joint testing device for testing the joint integrity of two connected pipe sections, each having a bore pressurized with a test gas which is lighter than air at the joint during testing comprising:
   a. an annular envelope having means for affixing the envelope to the annular external joint of two pipe sections being tested;
   b. an annular header positioned within the envelope and above the joint being tested during operation and having gas inlet openings which are radially spaced about the joint being tested so that the openings can communicated circumferentially with the envelope above the joint to receive gas leaking from the joint at any radial position of the joint; and
   c. suction connection means for drawing gas from the envelope through the openings into the header so that test gas leaking from any radial position of the external annular pipe joint will rise and enter the header.

2. The pipe testing device of claim 1 wherein the envelope is a unitary collar having upper and lower shoulders with inner annular sealing surfaces that form a seal with the pipe being tested.

3. The pipe testing device of claim 2 wherein the header is positioned adjacent the upper shoulders.

4. The pipe testing device of claim 2 wherein the collar has a vertical cut extending between the sealing surfaces so that the collar can be radially expanded to assemble/disassamble the collar about a pipe joint to be tested.

5. The pipe testing device of claim 2 further comprising temporary closure means for securing the collar to a pair of connected pipe sections about the pipe joint between the two sections.

6. The pipe testing device of claim 1 wherein the suction connection means is a tee mounted within the annular header.

* * * * *